F. A. NICHOLS.
BALANCING DEVICE.
APPLICATION FILED APR. 24, 1916.
1,218,689.
Patented Mar. 13, 1917.
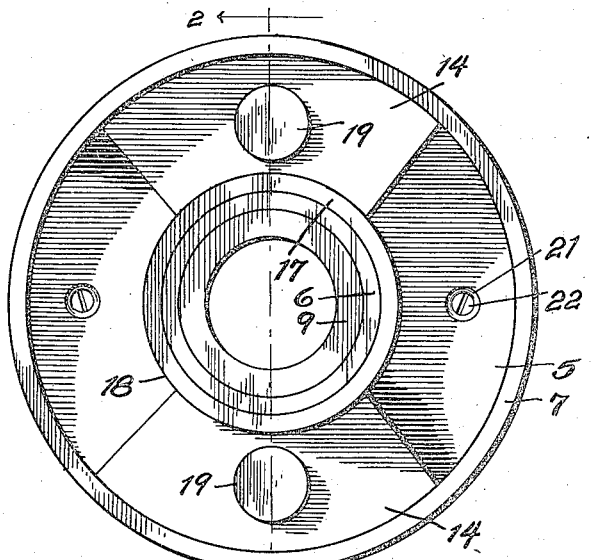
Fig. 1.
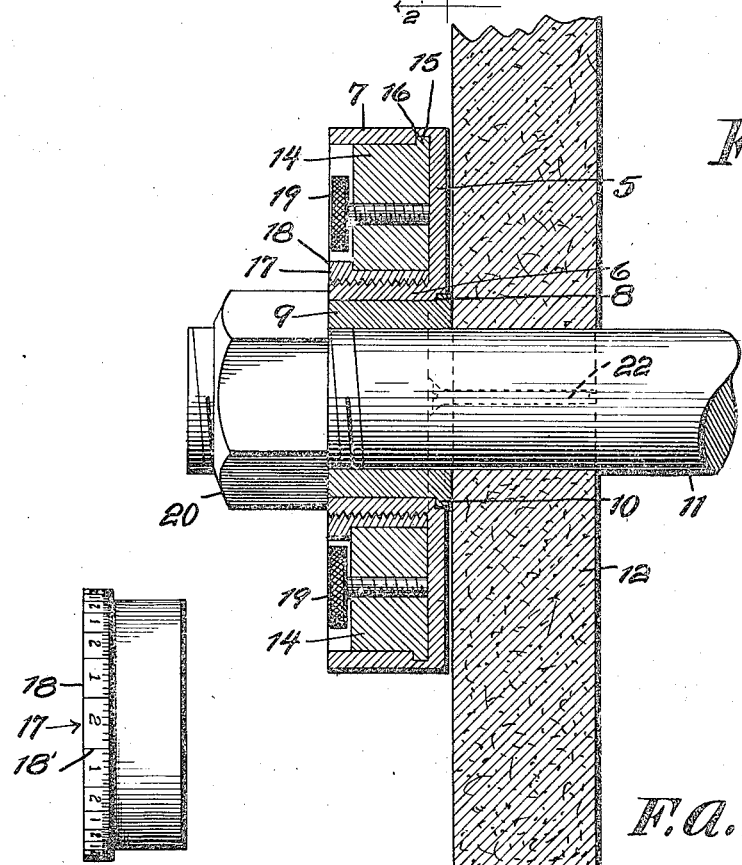
Fig. 2.
Fig. 3.
Inventor
F. A. Nichols,
By C. L. Parker
Attorney

UNITED STATES PATENT OFFICE.

FRED A. NICHOLS, OF BATTLE CREEK, MICHIGAN.

BALANCING DEVICE.

1,218,689. Specification of Letters Patent. Patented Mar. 13, 1917.

Application filed April 24, 1916. Serial No. 93,254.

*To all whom it may concern:*

Be it known that I, FRED A. NICHOLS, a citizen of the United States, residing at Battle Creek, in the county of Calhoun and State of Michigan, have invented certain new and useful Improvements in Balancing Devices, of which the following is a specification.

My invention relates to improvements in a balancing device, adapted for attachment to a rotatable member, such as a polishing or grinding wheel, etc.

An important object of the invention is to provide a device of the above mentioned character, which is of simple construction, inexpensive to manufacture, and may be accurately adjusted in a highly convenient manner.

A further object of the invention is to provide a balancing device of the above mentioned character, which is detachably secured to the rotatable member, and may be conveniently attached thereto and removed therefrom.

Other objects and advantages of the invention will be apparent during the course of the following description.

In the accompanying drawings forming a part of this specification and in which like numerals are employed to designate like parts throughout the same, Figure 1 is a side elevation of a device embodying the invention, Fig. 2 is a transverse sectional view taken on line 2—2 of Fig. 1, and, Fig. 3 is a side elevation of a keeper ring, removed.

In the drawings, wherein for the purpose of illustration is shown a preferred embodiment of my invention, the numeral 5 designates the body portion of the device, in the form of a wheel or circle and having outwardly extending inner and outer flanges 6 and 7, which are concentric as shown. These flanges are preferably formed integral with the body portion of the device. The inner flange 6 is provided with an annular groove 8, and a filler ring 9 is adapted for insertion therein and has a flange 10 formed upon its free end.

The filler ring 9 is adapted for the reception of a spindle 11, upon which a grinder 12 is rigidly mounted. This filler ring is removable and there are preferably a plurality of the filler rings, having openings or bores to receive spindles 11 of different sizes.

The numeral 14 designates circumferentially adjustable weights, mounted within the outer flange 7 and having flanges 15, to enter groove 16 formed upon the interior of the flange 7. The flange 7 also serves as a guard for the weights 14. The numeral 17 designates a keeper ring, having screw-threaded engagement with the exterior of the inner flange 6, as shown. This keeper ring is provided at its outer end with an outwardly projecting flange 18, serving to prevent displacement of the weights 14. The flange 18 is provided upon its periphery with a scale 18', serving to indicate the extent of movement of the weights 14, as is obvious.

These weights may be circumferentially adjusted, and locked in adjustment at desired positions, by means of clamping bolts or screws 19, the inner ends of which contact with the body portion of the device, as shown.

The outer end of the spindle 11 projects outwardly beyond the filler ring 9 and is screw-threaded for the reception of a nut 20, serving to clamp the filler ring 9 to the flange 6 and the entire device to the wheel.

The body portion 5 is provided with openings 21, receiving screws 22 or the like, which engage with the grinder 12, preventing the grinder from rotating with respect to the device. It is obvious that the balancing device is rigidly secured to the grinder and may be detached therefrom, in a highly convenient manner.

From the foregoing description it is apparent that the device may be securely attached to the grinder, and either or both weights 14 securely adjusted in a highly convenient manner by proper manipulation of the clamping bolts or screws 19.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In apparatus of the character described, a body portion having substantially annular inner and outer flanges, weights adjustably mounted between the flanges, a keeper ring engaging one flange and adapted to retain the weights between the flanges, and means to lock the weights in adjustment at desired positions with relation to the body portion.

2. In apparatus of the character described, a body portion having substantially annular inner and outer flanges, a weight adjustably mounted between the flanges, a keeper ring having screw-threaded engagement with one flange and provided with a laterally projecting flange to overhang the weight and retain it in place, and clamping means carried by the weight to lock it in adjustment at a desired position with respect to the body portion.

3. In apparatus of the character described, a body portion having substantially annular inner and outer flanges with the outer flange being provided with an interior groove, a weight adjustably mounted between the flanges and provided upon its outer portion with a flange to enter the groove and having a screw-threaded opening formed therein, a clamping screw arranged within the screw-threaded opening to contact with the body portion, a keeper ring detachably connected with the inner flange and contacting with the weight, and means to secure the body portion to a rotatable member.

4. In apparatus of the character described, a body portion having substantially annular laterally extending inner and outer flanges, a weight adjustably mounted between the flanges, means to lock the weight to the body portion, a filler ring removably mounted within the inner flange with its forward end substantially flush with the forward end of the inner annular flange and its rear end flanged and extending outwardly beyond the inner annular flange for a short distance, a spindle passed through the filler ring, a rotatable member carried by the spindle and contacting with the flanged end of the filler ring, and a nut carried by the forward end of the spindle.

In testimony whereof I affix my signature in presence of two witnesses.

FRED A. NICHOLS.

Witnesses:
HARRY J. STRINGHAM,
L. C. HAUCK.